United States Patent
Andresen, Jr.

[15] 3,683,690
[45] Aug. 15, 1972

[54] VARIABLE TIME CONSTANT ALTITUDE RATE DEVICE

[72] Inventor: John H. Andresen, Jr., Hewitt, N.J.
[73] Assignee: Intercontinental Dynamics Corporation, Englewood, N.J.
[22] Filed: July 29, 1970
[21] Appl. No.: 59,202

[52] U.S. Cl. ................................................... 73/179
[51] Int. Cl. .............................................. G01c 21/00
[58] Field of Search ....73/179, 386; 244/77; 318/229

[56] References Cited
UNITED STATES PATENTS
3,028,534   4/1962   Chilton .................... 73/179 X

*Primary Examiner*—Donald O. Woodiel
*Attorney*—Ostrolenk, Faber, Gerb & Soffen

[57] ABSTRACT

A pressure altitude rate indicator is constructed with means for providing variable time constant damping which decreases with increases in altitude rate. Variable time constant damping is achieved by producing a D.C. voltage analog derived from an A.C. voltage analog of the rate at the output of an altitude transducer motor-generator. The D.C. analog is passed through a variable time-constant filter whose variable element is driven by the same servo system that drives the rate display indicator. The output from the variable time constant filter provides one input to the differential amplifier of the display servo. The other input to this differential amplifier is provided by the movable contact of a follow-up potentiometer connected across the output of a D.C. reference voltage source. The parameters of the circuit are selected so that within the most used portion of the range being measured, variations in time constant damping are such that the effect is the same as producing a readout each time there is an altitude change of a predetermined magnitude.

7 Claims, 1 Drawing Figure

PATENTED AUG 15 1972
3,683,690
INVENTOR
JOHN H. ANDRESEN, JR.
BY
Ostrolenk, Faber, Gerb & Soffen
ATTORNEYS
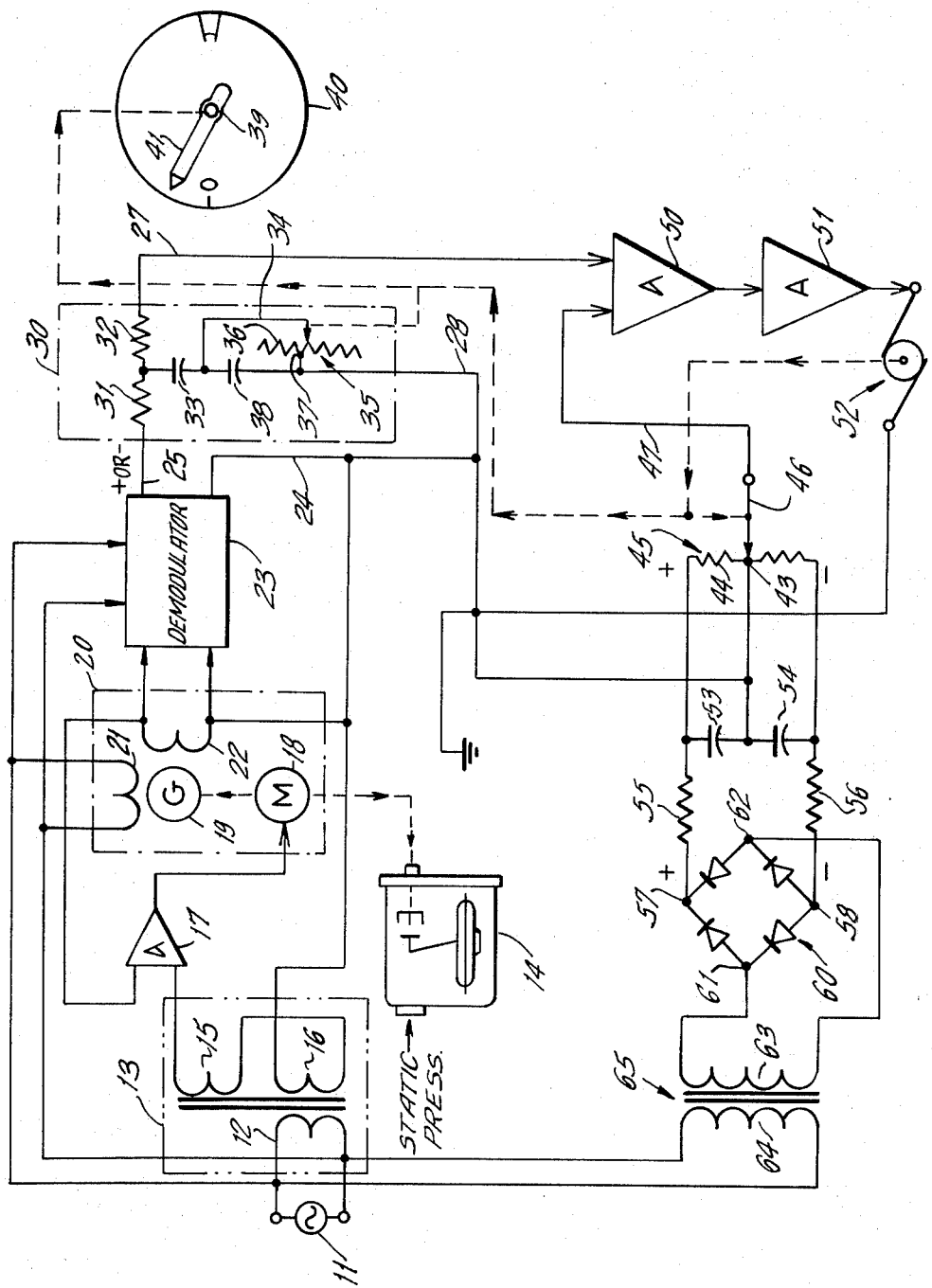

VARIABLE TIME CONSTANT ALTITUDE RATE DEVICE

This invention relates to rate indicators in general and more particularly relates to rate indicating apparatus having variable time constant damping.

In a typical, wholly pneumatic altitude indicator for aircraft, the reduction of oscillations due to rough air is accomplished by introducing a lag in indication in the form of a fixed time constant at all pressure altitude rates, but with increasing time constant with increased altitude.

The average value of the damping time constant for indicators in service is approximately five seconds and often varies within the range of from 3 to 7 seconds at sea level. This time constant is chosen on the basis of factors that are subjective, so that the choice varies from pilot to pilot, and differs depending upon the types and speed ranges of the aircraft.

In purely pneumatic rate indicators of the prior art, the damping time constant varies with pressure altitude, with damping at 42,000 feet being approximately five times the damping at sea level. This effect is undesirable, since it greatly reduces the usefulness of the rate indicator at high altitudes. Certain electric altitude rate indicators operate from a signal which is the derivative of the pressure altitude obtained from a pressure altitude transducer in an air data computer or a servo altimeter. This group of indicators utilizes the same time constant for all altitudes. There are still other altitude rate indicators in which the pointer is actuated, not only from the pneumatically derived input, but there is an integrated signal of vertical acceleration which provides an additional input to produce a more rapid altitude rate signal at all altitudes.

In the device of the instant invention, a pneumatic altitude rate indicator is constructed so that the indication lag or time constant decreases as altitude rate increases. In a preferred embodiment of this invention, it appears that the lag, or damping, vary so that the slope of the altitude variation curve is measured as a running average over a fixed number of feet of altitude, at all altitudes, and at all rates. For example, at a rate of 1,000 fpm and a time constant of five seconds, the rate is measured over an 83 foot change. If, in this same device, at a rate of 5,000 fpm there is a time constant of 1 second, the rate is measured over the same 83 foot interval. When the time constant varies in the manner described, the rate indicator may be used more directly to predict the altitude at some future time.

Pertuberations in the measured static air pressure which control the desired lag are substantially independent of altitude rate. This results in the same smoothing effect for rates measured over the same altitude interval. As a practical matter, 5 seconds is a minimal acceptable value of time constant at low rates, and the decreased time constant at higher rates produces equal smoothing. Because of this, the pilot is able to set a rate more rapidly at high rates.

Accordingly, a primary object of the instant invention is to provide a novel construction for a rate indicator.

Another object is to provide a novel rate indicator having means for producing variable time constant damping.

A further object is to provide a novel pressure altitude rate indicator in which time constant damping decreases as the rate increases.

These objects as well as other objects of this invention will become more readily apparent after reading the description of the accompanying drawing in which the single FIGURE is a schematic representation of an altitude rate indicator constructed in accordance with teachings of the instant invention.

Now referring to the drawing, the output of A.C. source 11 is connected across the primary winding 12 of variable coupling transformer 13 forming part of air data system altitude transducer 14. Secondary windings 15, 16 of transformer 13 are connected in bucking relation to the input for servo amplifier 17, which controls the input to servo motor 18 forming part of rate generator 20.

Motor 18 drives generator 19 to control coupling between generator input and output coils 21, 22. Input coil 21 is energized directly from source 11 which also energizes demodulator 23. An A.C. signal that varies linearly with altitude rate is generated in output coil 22 and provides the input to demodulator 23. Output lines 24, 25 connect demodulator 23 to the input of variable time constant filter 30. The output across lines 24, 25 is a polarity reversing D.C. voltage analog proportional to the phase inverting A.C. voltage analog output of rate generator 19.

The output of variable time constant filter 30 appears across lines 27, 28. Line 28, together with demodulator output line 24 and one end of the series combination of secondary windings 15, 16 are grounded. Demodulator output line 25 is connected to filter output line 27 through the series combination of resistors 31, 32. The junction between resistors 31, 32 is connected through capacitor 33 to movable contact arm 34 of potentiometer 35 having resistance element 36. Movable contact arm 34 is connected through capacitor 38 to contact point 37 intermediate the ends of resistor 360 Movable contact arm 34 is ganged to drive shaft 39 for pointer 41 of display indicator 40, and is also ganged to movable contact arm 46 of follow-up potentiometer 45 having resistance element 44.

The output of variable time constant filter is sent along line 27 to differential amplifier 50. The latter has another input connected through 47 directly to movable contact arm 46 of follow-up potentiometer 45. The output of differential amplifier 50 is fed through power amplifier 51 to control the energization of torque motor 52, which drives the contact arms of potentiometers 35, 45 together with indicator point shaft 39.

Resistor 44 of follow-up potentiometer 45 is connected across the series combination of filter capacitors 53, 54 which are connected through the respective resistors 55, 56 to output terminals 57, 58 of bridge rectifier 60 having input terminals 61, 62 connected to secondary winding 63 of transformer 65, whose primary windings are connected across A.C. source 11. Center tap 43 of resistance element 44 is grounded, as is the junction between capacitors 53, 54 and one brush of torque motor 52.

The apparatus illustrated in the drawing operates as follows. Altitude servo motor 18 is calibrated to turn linearly with pressure altitude and drives generator 19 to produce an A.C. output that is linear with altitude rate. Due to air turbulence and to friction in the rotating servos, rate generator voltage sent to demodulator 23 will vary in an erratic manner from the average true value of altitude.

The polarity reversing D.C. voltage analog output of demodulator 23 is proportional to the phase inverting A.C. voltage input to demodulator 23. This D.C. voltage passes through variable time constant filter 30. The time constant of filter 30 varies in accordance with the location of wiper arm 34 on center tapped potentiometer resistor 36. When wiper 34 is at the center tap, corresponding to zero vertical speed, the time constant is maximum, being determined by the value of capacitor 33. At higher rates, the shunting of capacitor 38 by a portion of resistor 35 has the effect of shortening the time constant.

The output of filter 30 is compared with the D.C. voltage appearing at movable arm 46 of follow-up potentiometer 45, whose resistance 44 is energized by the reference voltage output of bridge rectifier 60. Ideally, the reference voltage used to energize follow-up potentiometer resistor 44 should be varied by a filter whose time constant is equal at all times to that of the rate being measured. However, as a practical compromise, a fixed value of time constant is used for the reference voltage, such fixed time constant corresponding to the lower end of the rate range. This is done because transient errors in rate are generally less acceptable at the lower rates experienced during approach.

The error voltage between the filtered rate signal on line 27 and the voltage at slider 46 of follow-up potentiometer 45 is amplified to drive D.C. torque motor 52, which through direct mechanical connections positions the movable elements of time constant varying potentiometer 35, follow-up potentiometer 45, and indicator pointer 41. The voltage analog of variable time constant altitude rate appears between ground and potentiometer slider arm 46.

Thus, it is seen that the instant invention provides a pneumatic altitude rate indicator in which the lag in indication necessary to satisfactorily reduce oscillators due to rough air is provided by a variable time constant filter having an element whose impedance is controlled in a manner such that the time constant decreases for increases in altitude rate. When the time constant varies in this manner, the rate indicated can be used more directly to anticipate altitude at some future time.

It should now be apparent to those skilled in the art that the teachings of the instant invention are not limited to moving a pointer to obtain improved rate indication, but may be used to provide an electrical output in analog or digital form, to be used for other systems in an aircraft. Such systems may include auto pilots, flight director systems, and collision avoidance systems.

While the embodiment of my invention illustrated in the drawing utilizes a servo-type motor-generator to produce rate signals continuously, hence at a very short rate, the instant invention also encompasses a device which is driven from digital signals indicative of altitude. In such a device, rate is obtained from timing a fixed altitude interval, say 16 feet, and a running type logic is used to obtain readings, each 2 feet, i.e., from 16 to 32 feet, then from 18 to 34 feet, then from 20 to 36 feet, etc. After each successive timing operation the previous data is disregarded. Timing may be accomplished by counting clock pulses over the fixed altitude interval.

Naturally, the instant invention is not limited to a rate measured over exactly the same altitude difference at all rates. In order to gain the most advantage in some situations, it is sufficient to approximate a rate measured over the same altitude difference. More particularly, at very low altitude rates, the fixed altitude difference would require an unreasonably long time to obtain a rate reading. Hence, in a practical embodiment, at rates less than say 20 percent of the rate range, the time constant may remain relatively constant rather than increasing to infinity as strict adherence to the slope over a constant altitude difference theory suggests.

Although there have been described preferred embodiments of this novel invention, many variations and modifications will now be apparent to those skilled in the art. Therefore, this invention is to be limited not by the specific disclosure herein, but only by the appending claims.

The embodiments of the invention in which an exclusive privilege or property is claimed are defined as follows.

1. Apparatus for indicating rate of change for a variable condition; said apparatus including first means acting in response to said variable condition to produce an output of unfiltered rate of change for said variable condition; a variable damping means having an input fed by said output of said first means; an output means; second means fed by said variable damping means and connected to said output means to produce an output thereat of variably damped rate of change for said variable condition; said first means including a transducer having an input connected to detect and respond to changes in said variable condition, and a rate generating means having an input driven by an output of said transducer; said output means including a display device, and servo means fed by output signals generated by said damping means, and driving said display device; said damping means including a variable impedance element, and said servo means controlling the impedance of said impedance element whereby time constant damping of said display device automatically varies in relation to changes in said variable condition which occur over a predetermined range thereof; said output of said rate generating means being a voltage analog of the rate of change being detected by the transducer; said indicator means also including a reference voltage generator, and another damping means having an input fed by said reference voltage generator; said another damping means including another variable impedance element; said servo means also controlling said another impedance element, whereby the output of the reference voltage generator is a voltage that automatically varies in relation to changes in said variable condition occurring in said predetermined range.

2. Apparatus as set forth in claim 1, in which the variable condition is pressure altitude and the transducer is pressure responsive.

3. Apparatus as set forth in claim 2, in which the time constant decreases with increase in the rate of change being indicated.

4. Apparatus as set forth in claim 1, in which there is a differential amplifier which controls operation of the servo means, by generating signals derived by comparing the outputs of the damping means with one another.

5. Apparatus as set forth in claim 4, in which the variable condition is pressure altitude and the transducer is pressure responsive.

6. Apparatus as set forth in claim 5, in which the time constant decreases with increases in the rate of change being indicated.

7. Apparatus for indicating rate of change of altitude; said apparatus including first means to generate electric signals related to altitude; second means driven by said electric signals and producing signals related to changes in said altitude, at a relatively short rate; output means receiving signals from said second means and producing output signals related to said rate of change at a relatively long time constant that varies as an inverse function of said rate of change; said output signals of said output means being derived from signals produced over a relatively constant interval change in altitude.

* * * * *